No. 692,109. Patented Jan. 28, 1902.
N. F. BONIFACE.
COMBINED HEATER, COOLER, AND STORAGE BASKET.
(Application filed Nov. 27, 1901.)
(No Model.) 2 Sheets—Sheet 1.
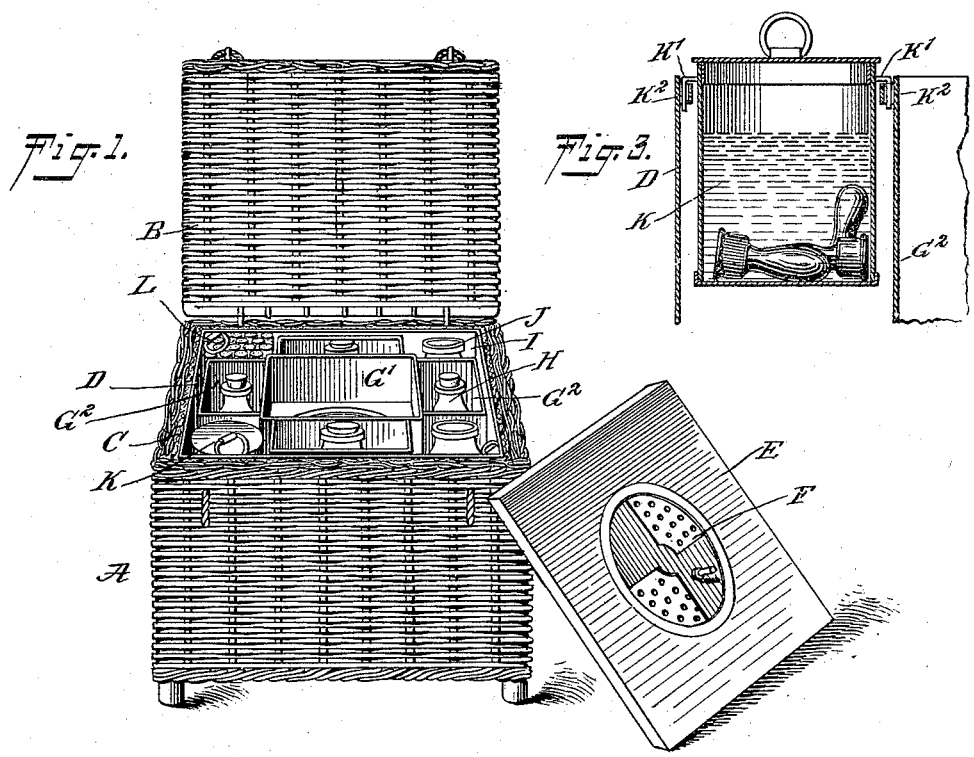
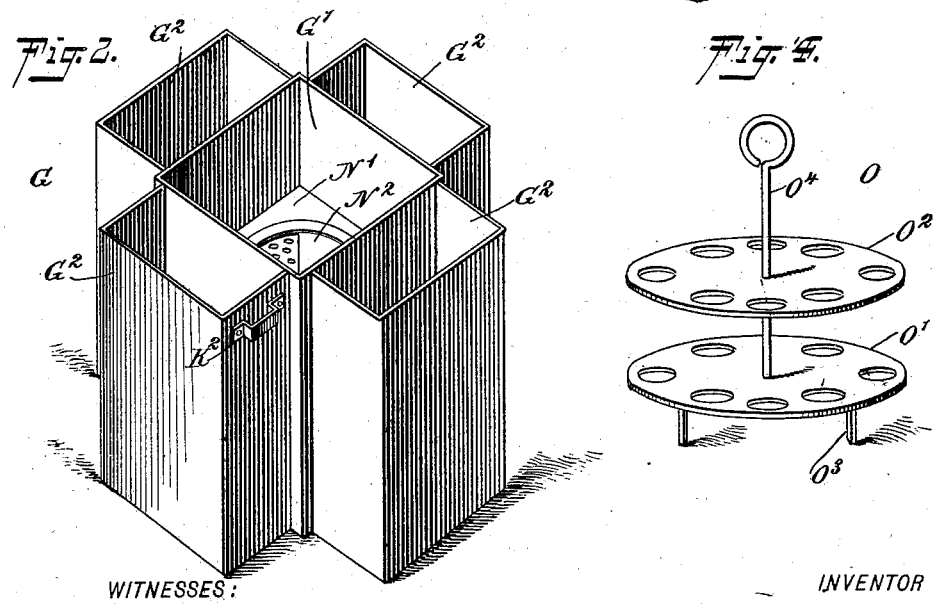
WITNESSES: William P. Goebel.
INVENTOR Nonna Ferner Boniface
BY
ATTORNEYS
THE NORRIS PETERS CO., PHOTO-LITHO., WASHINGTON, D. C.

No. 692,109. Patented Jan. 28, 1902.
N. F. BONIFACE.
COMBINED HEATER, COOLER, AND STORAGE BASKET.
(Application filed Nov. 27, 1901.)
(No Model.) 2 Sheets—Sheet 2.
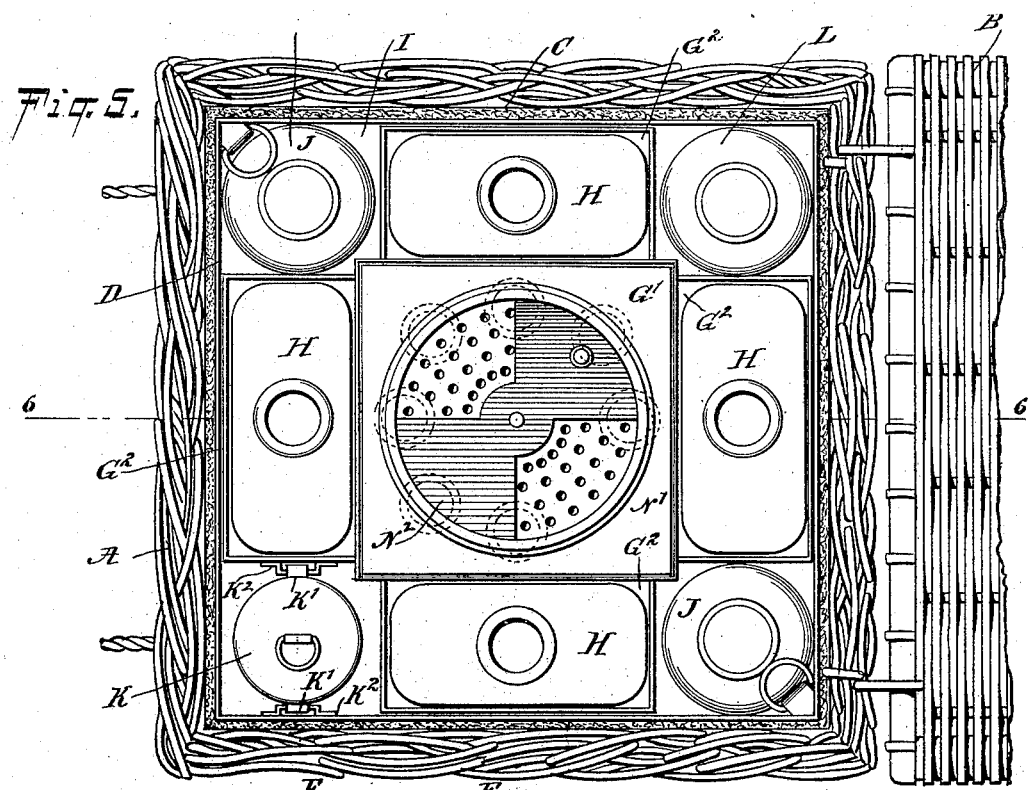
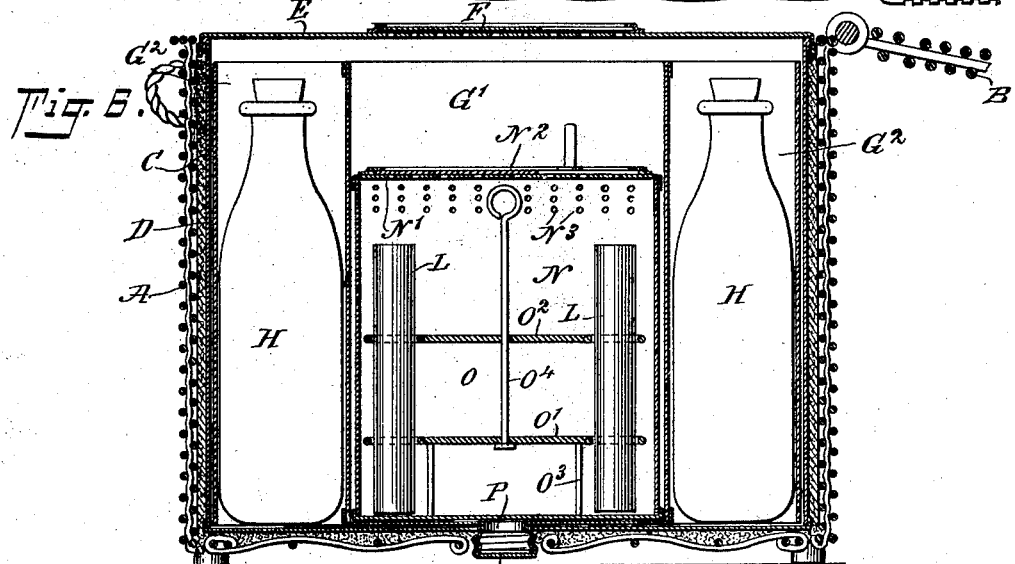
WITNESSES:
William P. Goebel
Theo G. Hoster
INVENTOR
Nonna Ferner Boniface
BY
Munn
ATTORNEYS

UNITED STATES PATENT OFFICE.

NONNA FERNER BONIFACE, OF NEW YORK, N. Y.

COMBINED HEATER, COOLER, AND STORAGE-BASKET.

SPECIFICATION forming part of Letters Patent No. 692,109, dated January 28, 1902.

Application filed November 27, 1901. Serial No. 83,819. (No model.)

*To all whom it may concern:*

Be it known that I, NONNA FERNER BONIFACE, a citizen of the United States, and a resident of the city of New York, borough of Manhattan, in the county and State of New York, have invented a new and Improved Combined Heater, Cooler, and Storage-Basket, of which the following is a full, clear, and exact description.

The invention relates to baggage; and its object is to provide a new and improved combined heater, cooler, and storage-basket for containing filled and empty nursing-bottles, supply-bottles, nipples, and other articles and food products, also fuel, the device being arranged to permit of conveniently heating the milk in the nursing-bottle or for cooling the same and being portable and more especially designed for use when traveling in railroad-cars and other vehicles or when staying at hotels and other places, to enable parents and attendants to keep a supply of milk or other food products on hand in a heated or cooled condition for immediate use by invalids, infants, and other persons, the device being also serviceable for use by outing parties, &c.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the figures.

Figure 1 is a perspective view of the improvement, showing the cover of the basket open and the lid of the box removed and leaning against the basket. Fig. 2 is an enlarged perspective view of the container. Fig. 3 is an enlarged sectional elevation of the nipple-holder and its support. Fig. 4 is a perspective view of the grate for the heater. Fig. 5 is an enlarged plan view of the improvement, showing the basket-cover open and the lid of the container removed; and Fig. 6 is a sectional side elevation of the same on the line 6 6 in Fig. 5 with the lid of the box in position.

The improved device is mounted in a basket A, having a hinged cover B and lined on the inside with a lining C of asbestos or other suitable material. In this basket A is set a box D, preferably made of sheet metal and fitting snugly against the lining, as is plainly indicated in the drawings, and this box is provided with a removable lid or cover E, provided at the center with a damper F, under the control of the user of the device.

Into the box D fits a container G, preferably made of sheet metal and formed with a central compartment G', preferably square in cross-section, and on the outer walls of this central compartment are arranged boxes $G^2$, four in number and of a size to receive ordinary nursing-bottles H, as is plainly indicated in Figs. 1, 5, and 6. The boxes $G^2$ form in the corners of the box D storage-compartments I, of which some are used for containing supply-bottles J or like receptacles. One is preferably used for containing a nipple-box K, having hooks K' at its sides, engaging corresponding keepers $K^2$, of which one is located on the inside of the box D and the other on the opposite wall of a box $G^2$. Another compartment I is preferably used for the fuel L in the shape of sticks of Chinese punk. Charcoal may also be stored under the nipple-box K, as the latter does not extend the full depth of the corresponding compartment. The box K is mounted so as to swing to allow the water to wash the nipples, the water being set in motion on moving the basket about. The charcoal is used for keeping the basket and contents in a sweet condition.

In the central compartment G' is held a heater N, so as to heat the surrounding boxes $G^2$ and the nursing-bottles H, contained in said boxes, so that the milk in the nursing-bottles is kept at the proper temperature and is ready for immediate use whenever required. This heater N consists, essentially, of a box having a removable cover N', provided with a damper $N^2$, and near the upper ends of the sides of the box are arranged air-inlets $N^3$, as is plainly indicated in Fig. 6. A grate O is set in the heater-box for supporting the sticks of punk L in a vertical position, said grate preferably consisting of two perforate supports O' $O^2$, spaced apart one above the other, the lower one having legs $O^3$, resting on the bottom of the compartment G', the supports being connected with each other by a handle-rod $O^4$, adapted to be taken hold of by the user of the device to remove the grate from the heater-box whenever it is desired to empty the same of the ashes or for cleaning the same, &c.

When it is desired to use the device as a cooling apparatus, then the heater N is removed from the central compartment G and the latter is filled with ice or other cooling medium, and in order to withdraw from time to time the water from said compartment I provide the bottom thereof with an outlet P, extending through openings in the bottoms of the box D and basket A, the outer end of the outlet being normally closed by a removable screw-cap P' or a like device.

Having thus described my invention, I claim as new and desire to secure by Letters Patent—

1. A device of the class described, comprising a heat-retaining holder, a box fitted therein, a container held in the said box and having a central chamber and pockets on the outside walls of the chamber, the said container forming with the box separate storage-compartments, as set forth.

2. A device of the class described, comprising a heat-retaining holder, a box fitted therein, a container held in the said box and having a central chamber, pockets on the outside walls of the chamber, the said container forming with the box separate storage-compartments, and a heater removably held in the said central chamber, as set forth.

3. A device of the class described, comprising a heat-retaining holder, a box fitted therein, a container held in the said box and having a central chamber, pockets on the outside walls of the chamber, the said container forming with the box separate storage-compartments, a heater removably held in the said central chamber, the said heater comprising a box having a lid provided with a damper, and a grate held in the said box for burning the fuel, as set forth.

4. A device of the class described, comprising a heat-retaining holder, a box fitted therein, a container held in the said box and having a central chamber, pockets on the outside walls of the chamber, the said container forming with the box separate storage-compartments, a heater removably held in the said central chamber, the said heater comprising a box having a lid provided with a damper, and a grate held in the said box for burning the fuel, the said grate being removably held in the box and formed of spaced apertured retainers for the punk, and provided with legs and a handle, as set forth.

5. A device of the class described, comprising a heat-retaining holder, a box fitted therein, a container held in the said box and having a central chamber, pockets on the outside walls of the chamber, the said container forming with the box separate storage-compartments, an outlet leading from the bottom of the central chamber and extending through the bottoms of the box and holder, and means for closing the outlet, as set forth.

6. A device of the class described, comprising a heat-retaining holder, a box fitted therein, a container held in the said box and having a central chamber, pockets on the outside walls of the chamber, the said container forming with the box separate storage-compartments, and a nipple-box removably supported in one of the storage-compartments, as set forth.

7. A device of the class described, comprising a heat-retaining holder, a box fitted therein, a container held in the said box and having a central chamber, pockets on the outside walls of the chamber, the said container forming with the box separate storage-compartments, and a nipple-box removably supported in one of the storage-compartments and provided with hooks engaging eyes on opposite walls of the box and one of the pockets, as set forth.

8. A device of the class described, comprising a heat-retaining holder, a box fitted therein, a container held in the said box and having a central chamber, pockets on the outside walls of the chamber, the said container forming with the box separate storage-compartments, a heater removably held in the said central chamber, the said heater comprising a box having a lid provided with a damper, and a grate held in the said box for burning the fuel, the said heater-box having air-inlets above the grate, as set forth.

In testimony whereof I have signed my name to this specification in the presence of two subscribing witnesses.

NONNA FERNER BONIFACE.

Witnesses:
   THEO. G. HOSTER,
   EVERARD BOLTON MARSHALL.